United States Patent Office 3,542,596
Patented Nov. 24, 1970

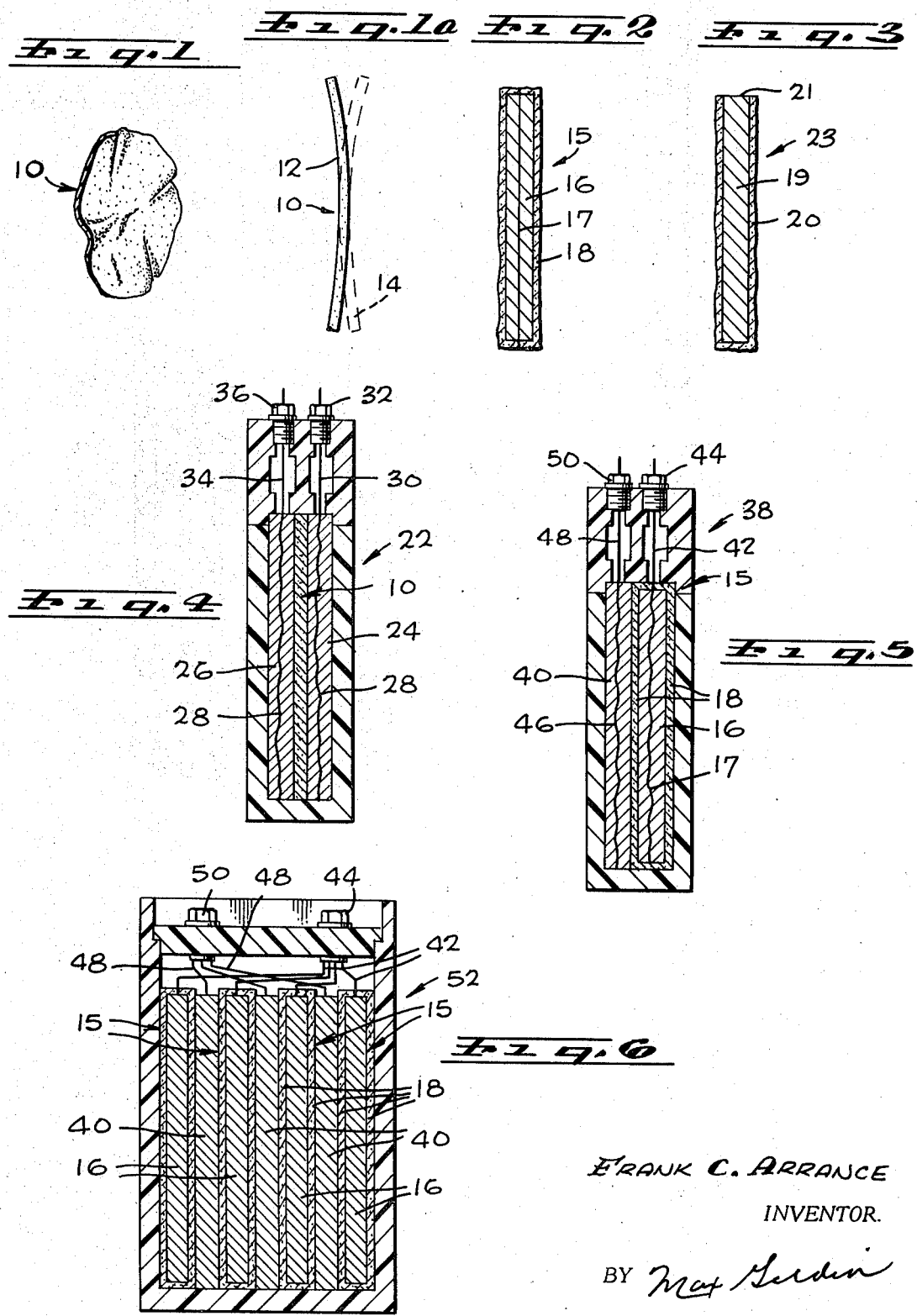

3,542,596
BATTERY SEPARATOR
Frank C. Arrance, Costa Mesa, Calif., assignor to McDonnell Douglas Corporation, Santa Monica, Calif., a corporation of Maryland
Filed Oct. 18, 1967, Ser. No. 676,223
Int. Cl. H01m 3/02
U.S. Cl. 136—6    16 Claims

ABSTRACT OF THE DISCLOSURE

Production of a separator on a battery electrode, preferably by dip-coating an electrode such as a silver or zinc electrode in a mixture of a major portion of an inorganic or ceramic separator material, a minor portion of potassium titanate in short fiber form, and a minor portion of an organic polymer, e.g., polyphenylene oxide, dissolved in a suitable solvent such as chloroform. The electrode is placed in the mixture preferably maintained under vibration, and stirred; the electrode and applied coating are removed from the mixture, and the coating is air-dried to remove solvent and is cured at elevated temperature. The resulting porous, substantially inorganic separator is securely attached to the electrode, and has low resistivity, is smooth and uniform in thickness, and is flexible. Alternatively, such as separator can be formed on any suitable supporting surface, such as a glass plate, and the resulting flexible separator stripped from such plate to produce a flexible porous, substantially inorganic separator membrane for incorporation between the electrodes of a battery.

---

This invention relates to production of flexible porous membranes, especially flexible porous separators for use in a battery, particularly a high energy density battery, and which is composed in preferred practice chiefly of inorganic material, and which is resistant to chemicals such as alkaline solutions, has good strength, low resistivity, and which will withstand operation in a battery at elevated temperatures of the order of 100° C. and above, and is particularly concerned with the provision of an electrode-separator unit having a flexible porous separator of the type noted above, applied and adhered to the surface of the electrode, e.g., by a simple dip-coating and curing operation. The invention is also concerned with procedure for producing such flexible membranes and electrode-flexible separator units and to batteries incorporating same.

Batteries are an important source of energy storage for power generation. In addition to the common lead-acid storage battery, an important type of battery is the high energy density alkaline electrolyte battery using such electrode combinations as silver-zinc, silver-cadmium and nickel-cadmium. High energy density batteries are generally battery systems which have a substantially higher energy per unit of weight than conventional, e.g., lead-acid, storage batteries. Such high energy density batteries have many applications such as in portable tools and appliances, television, radio and record players, engine starting, portable X-ray units, and the like. In such batteries, it is conventional to employ a separator in the form of a porous member between the electrodes.

In high energy density batteries such as silver-zinc, nickel-cadmium and silver-cadmium, the separator performs the function of retaining electrolyte, e.g., potassium hydroxide, separating the electrodes, and permitting transfer of electrolyte ions but preventing migration of electrode ions or growth of dendritic crystals of electrode ions which short circuit the battery.

Improved inorganic separators in the form of certain aluminosilicates which are particularly suited for use in high energy density batteries are described, for example, in the copending application of Carl Berger and Frank C. Arrance, Ser. No. 499,294, filed Oct. 21, 1965, now Pat. No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperature, e.g., of the order of 100° C. and above.

However, these rigid sintered separators present certain manufacturing, design and assembly problems. Thus, the production of the above-noted rigid inorganic separators, which are in the form of very thin membranes, requires a certain care in handling, packing and assembling in a battery to prevent cracking and breaking thereof. It has, therefore, assumed considerable importance to provide an inorganic separator which is readily produced and having the advantageous properties of the inorganic separators noted above, that is, having low resistivity, resistance to corrosive chemicals and operability at elevated temperatures, e.g., about 100° C., but which, in addition, is flexible and thus avoids the disadvantages of the rigid inorganic separators.

Further, the above inorganic separators or membranes are substantially rigid, and when employed in a battery between adjacent electrodes, e.g., zinc and silver electrodes, during operation of the battery, the electrodes, particularly the zinc electrode, tends to change shape and to move out of complete contact with the separator, thus reducing the electrical efficiency of the battery. Also, when employing the above-noted substantially rigid inorganic separators, it is necessary, when assembling such separators in a battery, together with the necessary electrodes or electrode plates, to mount the individual separators in properly spaced relation to provide electrode compartments between adjacent separators, and to then insert the electrodes in the electrode compartments between an adjacent pair of separators. This not only requires proper spacing of the separators so as to receive the electrodes therebetween in relatively snug fitting relation, but also requires that the electrode compartments on opposite sides of a separator be properly insulated to prevent short-circuiting of electrolyte from one electrode compartment around a separator and into the adjacent electrode compartment. Accordingly, a further particular area of interest has been the need for provision of electrodes having a flexible separator film or coating contained thereon, which is readily applied to the electrode, and which operates efficiently as a separator and avoids the disadvantages of separate rigid separators noted above.

In the copending application of Frank C. Arrance, et al., Ser. No. 378,898, filed June 29, 1964, now Patent No. 3,364,077, there is described a separator formed by mixing an inorganic material such as potassium titanate with an organic bonding agent such as Teflon, employed in substantial or major amount, e.g., equal proportions of these components, and compressing and heating the mixture at elevated temperatures. However, these also are rigid separators.

It has been found, according to the invention, that a flexible porous membrane or separator composed essentially of an inorganic material, and having the above-noted advantageous properties, can be produced by a process which comprises coating on a support surface, preferably a battery electrode, a film of a mixture consisting essentially of a major portion of a porous inorganic or ceramic material, a minor portion of short potassium titanate fibers in essentially non-agglomerated admixture, and a minor portion of a suitable organic polymer for bonding the ceramic and potassium titanate fibers, such as polyphenylene oxide, in a volatile solvent such as chloroform, removing the solvent from the coated film, as by air-drying, and heating the film at elevated temperatures to cure the polymer and cause same to bond the inorganic material and potassium titanate fibers into a porous, substantially inorganic, flexible and uniform coating of low electrical resistivity.

Thus, according to one embodiment of the invention, inorganic or ceramic separator material of any suitable type such as those described hereinafter, and chopped potassium titanate fibers, preferably of a size less than about 0.008 inch in length, are mixed together in major and minor proportions respectively, to form a highly uniform mixture of the inorganic separator material and potassium titanate fibers, essentially free of agglomerates or clumpy portions, due to removal of the static charges usually present in the potassium titanate fibers by mixing and milling of the potassium titanate fibers in the presence of the ceramic powder, as described more fully hereinafter.

It was found that such a mixture of inorganic or ceramic particulate material with short potassium titanate fibers, and free of agglomerates, fluffiness and static electrical charges, can be combined with a minor proportion of a suitable organic polymer, particularly polyphenylene oxide, having the ability to bond the inorganic powder and potassium titanate fibers, but at the same time affording suitable porosity in the so-bonded material, dissolved in a suitable volatile solvent such as chloroform, and the resulting mixture applied to battery electrodes such as a silver or zinc electrode, produces a thin, smooth uniform film thereon. This can be accomplished by dipping the electrode into the mixture, preferably while maintaining the mixture under vibration and subjected to a stirring action, to provide proper flow characteristics of the mixture, withdrawing the coated electrode containing a uniform coating of the mixture thereon, air drying the coating for removal of solvent and then oven curing the coating at elevated temperatures.

In the development of the present invention, it was found that a mixture of a major proportion of an inorganic or ceramic material and a minor proportion of an organic polymer such as polyphenylene oxide dissolved in chloroform can be applied as a thin uniform dip-coated separator film on a silver or zinc electrode, but that the resulting dried film had high resistivity and did not prove satisfactory in open circuit voltage tests, cells of this type so tested and employing such dip-coated separators losing their 1.86 volt open circuit voltage in as little as four hours. A minor proportion of potassium titanate fibers added to the above mixture also resulted in a coating on the electrode which, when tested, still had high resistivity, and the cell did not have good wet stand characteristics. Further, the potassium titanate fibers were present in clumps or agglomerates, held together by static electrical charges which resulted in rough coatings of non-uniform thickness and composition. It was not possible to break up these agglomerates and produce a homogeneous mixture by high speed mixing or by ball milling for as long as 15 hours, either in the wet or dry state.

It was discovered that, by chopping the potassium titanate fibers up into very short lengths of a size passing a 0.008 inch screen, thus substantially reducing the fluffiness of the potassium titanate material, and also by mixing the inorganic separator material and the short potassium titanate fibers, and milling same so as to produce a mixture of the inorganic ceramic material and potassium titanate fibers passing through a 0.008 inch screen, the previously agglomerated clumps of ceramic material and potassium titanate mixture became very uniform, non-fluffy, and free of clumpy agglomerates by removal of the static charges from the potassium titanate fibers during the milling operation, due to the presence of the ceramic or inorganic powder. Such a mixture, when combined with a minor portion of organic polymer as described hereinafter, particularly polyphenylene oxide, provides a thin, uniform film on an electrode, which upon curing of the polymer forms a uniform, porous, flexible film or separator having low resistivity.

The same procedure noted above for providing a separator on an electrode can be applied for providing a thin, flexible, substantially inorganic coating or separator on a support such as a glass plate, the glass plate dipped into the mixture of ceramic powder, potassium titanate particles and organic polymer in a solvent, and the coated plate withdrawn, dried, and the coating cured as noted above, followed by stripping of the separator from the support surface, to form a flexible, porous battery separator.

However, according to the preferred embodiment wherein a flexible, porous separator film is provided on a battery electrode, there is provided an electrode having an integrally attached flexible inorganic separator, having the advantages noted above, and which due to its flexibility can "give" and change its shape during the operation of the battery as a result of any change in shape of the electrode as by decomposition during the operation of the battery, but affords the advantage that it eliminates the necessity for assembling a plurality of individual separators in alternate relation with individual electrodes particularly when assembling a multiplate battery. Thus, the assembly of electrodes containing an attached flexible separator according to the invention in a multiplate battery, automatically places the attached separators in position between adjacent electrodes when the electrode-flexible separator units are assembled in the battery.

The inorganic separator material which can be used to form the flexible separators of the invention can include a variety of porous inorganic or ceramic substances in powder or particulate form. Thus, for example, suitable inorganic separator materials include insoluble hydrous metal oxides such as the hydrous oxides of zirconium, titanium, antimony, tungsten, silicon, scandium, bismuth, vanadium, aluminum and cerium in particulate form. Such hydrous metal oxide separator materials and their method of preparation are described in the copending application Ser. No. 379,093, filed June 30, 1964, of Carl Berger et al., now Pat. No. 3,489,610. A preferred separator of this type is hydrous zirconium oxide or zirconia.

Other porous inorganic materials which can be employed for producing the separator according to the invention include particulate sintered aluminosilicates, especially the alkali metal and alkaline earth metal aluminosilicates and alumina, because of their formation of a hard ceramic material upon sintering, while still retaining suitable porous characteristics. The aluminosilicates of suitable porous internal structure are particularly preferred in this respect. Examples include nonfluxed aluminosilicate, fluxed aluminosilicates or salts thereof, such as sodium and potassium aluminosilicates, and magnesium, calcium, barium and strontinum aluminosilicates, e.g., magnesium aluminosilicate (Cordierite). These materials can be used separately, but often mixtures of these particulate aluminosilicates are used, e.g., complex mixtures of both the alkali metal and alkaline earth metal aluminosilicates. Such aluminosilicate separator materials are described in the above copending U.S. application Ser. No. 499,294, now Pat. No. 3,379,570.

Another useful class of inorganic separator materials are the naturally occurring clay minerals of the kaolinite group. This is a group of naturally occurring clays containing aluminum oxide and silica, usually together with bound water, and having the formula $Al_2O_3 \cdot 2SiO_2 \cdot 2H_2O$. In addition to kaolinite, other useful members of this group include the mineral clays halloysite, dickite, nacrite and an auxite.

Other types of inorganic separator materials which can be employed include those in the form of a particulate sintered porous solid solution of magnesium silicate and a member selected from the group consisting of zinc silicate and iron silicate as described and claimed in the copending application Ser. No. 539,554, filed Apr. 1, 1966, of Frank C. Arrance et al., now Pat. No. 3,446,668, and the inorganic separator materials in the form of a particulate sintered porous solid solution of an aluminum-bearing material such as aluminum oxide, and a substance selected from the group consisting of chromium, cobalt, nickel, magnesium, calcium and iron-bearing materials, e.g., a mixture of alumina and chromic oxide, as described and claimed in copending application Ser. No. 555,891, filed June 7, 1966, of Frank C. Arrance et al., now Pat. No. 3,446,669.

The disclosures of the above copending applications are incorporated herein by reference.

Additional inorganic materials in particulate form which can be employed include silicates such as magnesium silicate (Fosterite), and the like.

It will also be understood that mixtures of the above particulate materials also can be employed.

The organic polymeric materials incorporated with the inorganic or ceramic materials or powders noted above to produce the flexible membrane or separator of the invention are preferably chosen from those curable polymers which have the property of bonding the individual particles of inorganic materials and the potassium titanate fibers together upon curing of the organic polymer, but do not fill the voids between the ceramic material and potassium titanate particles, so as to result in a porous structure effective when used as a battery separator. A preferred polymeric material which has been found particularly advantageous is polyphenylene oxide (marketed as PPO by General Electric). Polysulfone can also be employed but results in a less porous separator of higher resistivity than when employing polyphenylene oxide. Also, polyamides such as nylon, neoprene rubber, polyepoxides, such as the polymer of bisphenol A and epichlorhydrin (the Epons), and fluorocarbon polymers such as vinylidene fluoride polymers (Kynar), and the copolymer of hexafluoropropylene and vinylidene fluoride (Viton) may be employed. In addition to having the properties of bonding the particles of inorganic material and potassium titanate together so as to form a flexible, strong, thin membrane having suitable porosity for use as a battery separator, such polymers should be resistant to attack by chemicals such as alkaline solutions, e.g., potassium hydroxide solution, employed in high energy density batteries, both at ambient and at elevated temperatures.

The above-noted polymeric materials are employed in particulate or granular form, and mixtures of such polymeric materials also can be employed.

As previously noted, it has been found that the potassium titanate, although in fiber form, must be used as very short fibers not longer than 0.008 inch, to avoid clumping and agglomeration of the mixture. It is also preferred that the inorganic or ceramic powder be ground to a particle size such that 95% of the particles of such inorganic material are of less than 10 micron particle size.

The relative proportions of inorganic or ceramic material, potassium titanate particles and organic polymeric binder employed for producing the flexible membranes of the invention can vary. The amount of ceramic powder and potassium titanate together preferably should be at least 50%, and preferably substantially greater than 50%, of the mixture, and the amount of either the ceramic material or the potassium titanate employed can be less than or in excess of 50% of the mixture; ordinarily, the inorganic or ceramic material is present in major proportion and the potassium titanate in minor proportion. The amount of polymeric material can vary widely and can constitute as much as 50% or more of the mixture, but under these conditions the result is a separator of increased internal resistance, although having greater flexibility. Hence, in preferred practice, the organic polymeric material is employed in minor proportions to obtain sufficient bonding and porosity, yet to afford substantial flexibility. Thus, for example, generally there can be employed from about 60% to about 95% of inorganic or ceramic powder, about 2% to about 35% potassium titanate fibers, and about 2% to about 35%, by weight, of organic polymeric material. The proportion of polymeric material employed in combination with the mixture of ceramic material and potassium titanate is chosen to provide a membrane or separator of good flexibility and film strength, yet which has low resistivity and other characteristics permitting the membrane to function efficiently as a battery separator, especially in high energy density alkaline batteries.

The organic polymer is dissolved in a volatile solvent which dissolves the polymer and which has good volatility to permit quick removal from the coated film. Any suitable solvent having these characteristics can be employed. The particular solvent chosen depends in large measure on the particular polymer employed. Thus, for example, chloroform, trichloroethylene, toluene, mixtures of chloroform and carbon tetrachloride, and mixtures of chloroform and trichloroethylene have been found suitable for use with polyphenylene oxide polymer. Dimethyl acetamide has been found suitable for use with polysulfone and fluorocarbon polymers, and toluene has been found suitable for employment with neoprene rubber and epoxy material. The amount of solvent employed can vary, but generally the amount employed is such that the organic or polymeric solids content ranges from about 20 to about 70 parts per 100 parts by weight of solvent, the amount of solvent used being such that it is readily evaporated in a conveniently short time after film formation.

The mixture of inorganic or ceramic powder, e.g., aluminosilicate, and potassium titanate particles, and the organic polymer, e.g., polyphenylene oxide, dissolved in the solvent, is preferably maintained in vibration during dipping of the electrode or support for the coating in the mixture. This is preferably carried out by applying a suitable mechanical vibration source, e.g., an AC solenoid, adjusted to the proper frequency and amplitude to the dipping mixture to provide the desired flow characteristics of the mixture on the electrode or support, due to the thixotropic nature of the mixture, while at the same time the dipping mixture is subjected to a stirring action to sweep away bubbles which form during coating due to air escaping from the porous electrode plate. The vibration of the dipping mixture results in obtaining a uniform coating of the mixture on the electrode or support for the separator film. The vibration of the dipping mixture is adjusted in relation to the rate of withdrawal of the electrode so as to obtain a thin uniform coating without running or "tearing." In the absence of vibration of the dipping mixture, it is found that a non-uniform coating on the electrode or the support member generally results.

After the electrode or support containing the separator coating is removed from the mixture, it is subjected to air drying for solvent removal. The coating is then cured at temperatures which can range from about 100° to about 550° F., with the time of curing depending upon the particular polymer employed, the size of the particular surface being covered, and other factors, including the temperature of cure. Curing time can range, for example, from about 10 to about 30 minutes, at the above elevated temperatures. Although air drying of the coated film for an extended period of time, e.g., of the order of about 24 hours or more, can eliminate curing at elevated temperatures, this is not preferred practice.

The thickness of the resulting flexible, substantially inorganic film or separator formed on the electrode or other surface can range, e.g., from about 0.001 to about 0.025 inch, often from about 0.002 to about 0.008 inch in thickness.

The porosity of the flexible membranes or separators of the invention can range from about 10% to about 40%, but such range is understood to be only exemplary.

Pore sizes or diameters of the flexible, porous membranes generally range from about 1 to about 200 angstrom units, but can be outside this range.

The invention will be more clearly understood from the further description below of certain embodiments of the invention, taken in connection with the accompanying drawing, wherein:

FIG. 1 is an essentially schematic representation of a flexible membrane according to the invention;

FIG. 1a is an end view of the separator of FIG. 1;

FIG. 2 is a schematic representation of an electrode-flexible separator unit of the invention;

FIG. 3 is a modification of the unit of FIG. 2;

FIG. 4 shows the manner of assembly of the flexible separator of FIG. 1 in a single cell battery according to the invention;

FIG. 5 illustrates incorporation of the electrode-flexible separator unit of FIG. 2 in a single cell battery; and FIG. 6 illustrates an assembly of a plurality of the electrode-flexible separator units of FIG. 2 to form a multiplate battery.

It will be understood that the showings in the drawing are exaggerated for greater clarity.

The flexible membrane formed of a mixture of the inorganic material, potassium titanate particles and organic polymer above-described and illustrated at 10 in FIG. 1 of the drawing is highly flexible and can be bent in any direction, as indicated at 12 and 14 in FIG. 1a, but is of considerable strength and is resistant to tearing and can be handled readily without damage. Such flexible membrane can be employed efficiently as a battery separator between electrodes, e.g., silver and zinc electrodes in a high energy density battery, as illustrated in greater detail below.

According to a particular feature of the invention as described above, the thin flexible membrane composed chiefly of inorganic material can be formed as a film on a battery electrode. According to this embodiment of the invention, an electrode illustrated at 16 in FIG. 2, e.g., a silver electrode, and preferably containing a collector grid indicated at 17, has formed thereon a securely adherent and flexible coating of the inorganic material, potassium titanate particles and the bonding polymer, covering the electrode's surface, as indicated at 18. Since the entire surface of the electrode is thus covered by the flexible film, thereby completely encasing the electrode within the flexible separator, the flexible, essentially inorganic separator 18 on the electrode forms a covering which, when the unit 15, comprising the electrode 16 and covering 18, is incorporated in a battery, completely insulates the electrode from an adjacent electrode.

If desired, only a portion of the electrode surface can be coated in the above-described manner with the flexible, essentially inorganic membrane. Thus, as illustrated in FIG. 3, the electrode 19 is coated along the sides and bottom with the flexible membrane 20, according to the invention, leaving the top 21 uncovered. This type of electrode unit 23 can be incorporated in a battery, particularly wherein the electrolyte is filled to a height less than the height of the electrodes.

Any type of electrodes can be insulated and covered with a flexible separator membrane according to the invention. These include the lead electrodes employed in conventional lead-acid batteries, and particularly electrodes employed in high energy density batteries such as silver, zinc, cadmium and nickel electrodes.

During discharge of batteries such as those described and illustrated above, as is well known, e.g., in the case of a silver-zinc battery, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium," the terms "nickel" and "cadmium," and the term "lead" referring to the metals forming the respective electrodes of silver-zinc, silver-cadmium, nickel-cadmium and lead-acid battery systems, are intended to denote either the respective metals themselves or the corresponding oxides thereof.

It will be seen that a plurality of such electrode-separator units 15 or 23 can be readily assembled to form an electrode-separator pack in a battery by simply assembling a number of such electrode-separator units of one polarity, e.g., silver electrode-separator units, in alternating relation with a number of electrodes of opposite polarity, e.g., conventional zinc electrodes, or with a number of zinc-electrode-separator units according to the invention. When so assembled in a battery with the alternate electrode-separator units, e.g., silver-flexible separator units as illustrated in FIG. 2 or 3, in contact with alternate zinc electrodes, an electrode-separator pack is provided readily in which each of the electrode compartments is fully insulated from the adjacent electrode compartments. When assembling the respective electrode-separator units of the invention in a battery to form a battery pack as noted above, there is avoided the problem when employing individual separators and electrodes, of requiring first the proper supporting of such individual separators in suitably spaced relation to provide electrode compartments, and the introduction of the individual electrodes in such compartments.

The following are examples of practice of the invention.

EXAMPLE 1

A sintered powder of a solid solution of magnesium silicate and iron silicate, prepared as described in Example 7 of above U.S. application Ser. No. 539,554, now Patent No. 3,446,668 is prepared and such powder ground to a particle size such that 95% of the powder is composed of particles of less than 10 microns size.

Potassium titanate fibers are chopped up into very short lengths, sufficiently short so that the chopped fibers pass through a 0.008 inch screen.

A mixture of about 18 parts of the above magnesium silicate-iron silicate powder and about 1 part of the chopped potassium titanate fibers, by weight, is passed through a mill, the entire mixture being passed through a 0.008 inch screen several times. This results in a highly uniform, non-fluffy mixture of the ceramic powder and the shirt potassium titanate fibers in non-agglomerated form.

The resulting mixture of ceramic powder and potassium titanate fibers is then combined with one part by weight of polyphenylene oxide dissolved in chloroform, thus forming a mixture consisting of about 90% of the magnesium silicate-iron silicate ceramic powder, about 5% of potassium titanate particles, and about 5% polyphenylene oxide, by weight.

While maintaining the above mixture under vibration by means of an A.C. solenoid, and stirring, the mixture is cast onto the surface of a glass plate. The glass plate containing the applied coating is air-dried for 15 minutes to remove solvent, and the coating is then oven cured for 15 minutes at 350° F. The coated cured film is then stripped from the surface of the plate.

The resulting film is highly flexible as indicated at 10 in FIG. 1, has a porosity of about 15% and a pore size ranging from about 5 to about 100 angstroms, has good film strength, and can be handled readily without tearing. The thickness of the film is about 0.003 inch.

Resistivity measurements of this flexible porous separator gave low values of from about 5 to about 10 ohm-cm.

The resulting film indicated at 10 in FIG. 1 is assembled in a battery 22 in FIG. 4, together with zinc and silver electrodes 24 and 26, respectively, the flexible separator 10 being disposed between the electrodes and in contact with the adjacent surfaces thereof. Each of the electrodes 24 and 26 has a collector grid 28 therein, the collector grid of the zinc electrode 24 being connected by a lead wire 30 to a terminal 32, and the collector grid 28 of the silver electrode being connected by a lead 34 to a terminal 36 on the battery. A 30% potassium hydroxide solution is employed as electrolyte in the battery.

EXAMPLE 2

A mixture of magnesium silicate-iron silicate ceramic powder, potassium titanate particles and polyphenylene oxide in chloroform is prepared as described in Example 1 above.

While maintaining the mixture under vibration, and with stirring, a conventional silver electrode, formed by mixing equal parts of silver and silver oxide and compressing the mixture, is dipped into the mixture and withdrawn at a rate to obtain a thin smooth uniform film having a thickness of about 0.005 inch.

The film formed on the electrode is then air-dried, as described in Example 1 above, for 15 minutes to remove solvent and is then oven cured for 15 minutes at 350° F.

The resulting dip-coated separator having a thickness of about 0.005 inch, a porosity of about 15%, and a pore size ranging from about 5 to about 100 angstroms, has a low resistivity of about 5 to 10 ohm-cm., is flexible, uniform in thickness, smooth and free from clumps.

The resulting silver electrode-separator unit, as indicated at 15 in FIG. 2 of the drawing, including the attached flexible separator 18, is incorporated in a battery 38 as illustrated in FIG. 5, together with a conventional zinc electrode 40, the unit 15 being disposed substantially in contact with the zinc electrode 40, with an adjacent portion of the flexible film 18 of the silver electrode 16 being in contact with the adjacent surface of the zinc electrode. The collector grid 17 of the silver electrode is connected by a lead 42 to an external terminal 44, and the collector grid 46 of the zinc electrode is connected by means of a lead 48 to a terminal 50.

The resulting battery and also the battery of Example 1 operates successfully both at 25° C. and at 100° C. for more than 200- ½ hour charge-½ hour discharge cycles at a current of about 20 ma./cm.$^2$ during discharge, and at a 20% depth of discharge.

Test cells of the type described in Example 2 above maintain their nominal OCV (open circuit voltage) at 1.86 volts after being charged and allowed to stand for as long as 72 hours, and maintained their original capacity and OCV after as many as 8 total discharges at C/2 (half capacity).

EXAMPLE 3

The procedure of Example 2 is followed, except that a zinc electrode is employed for dip-coating instead of the silver electrode, and such zinc electrode-separator unit is incorporated in a battery of the type illustrated in FIG. 5, together with a conventional silver electrode.

Results are obtained similar to those of Example 2.

EXAMPLE 4

A mixture of 95% of the sintered magnesium silicate-iron silicate powder of Example 1, and 5% polyphenylene oxide dissolved in chloroform is prepared.

A silver electrode is dip-coated in the mixture, and dried and cured according to the procedure described in Example 2.

The resulting film has high resistivity of the order of about 50 ohm/cm. and such cells lose their 1.86 volt OCV in as little as 4 hours time.

EXAMPLE 5

To the mixture formed in Example 4, there is added unchopped potassium titanate fibers having a fiber length substantially greater than 0.008 inch to form a mixture having a ratio of 90% of the sintered ceramic powder, 5% polyphenylene oxide and 5% potassium titanate fibers.

A silver electrode is dip-coated in such mixture, dried and cured by procedure similar to that described in Example 2 above.

The resistivity of the resulting separator coating is still high, of the order of about 50 ohm/cm. and cells employing such electrode-separator units do not have good wet stand characteristics. Also the potassium titanate fibers in the mixture are present in clumps or agglomerates, held together by static electrical charges resulting in rough coatings of non-uniform thickness and composition on the electrode.

Examples 4 and 5 above show that in the absence of potassium titanate fibers, the resulting separator film has high resistivity, and also if the potassium titanate fibers are not chopped into very short lengths as in Example 1 above, the resulting separator also has high resistivity, as compared to the resistivity obtained for the separator in Examples 1 and 2 above.

EXAMPLE 6

There is illustrated in FIG. 6 the incorporation of the electrode-separator unit produced according to Example 2 and illustrated at 15 in FIG. 2, having a substantially inorganic flexible separator film 18 secured to the silver electrode 16, in a multiplate battery 52. In this arrangement, it is seen that four silver-separator units 15 according to the invention are alternately disposed in relation to three zinc electrodes 40, with the flexible film 18 of the respective units 15 separating adjacent silver and zinc electrodes 16 and 40, respectively. The leads 42 from the silver electrodes 16 are collectively connected to the terminal 44, and the leads 48 from the zinc electrodes 40 are collectively connected to the terminal 50. It is seen that the separator units 15 with the flexible substantially inorganic separator film 18 connected thereto permits simple placement of these units in the battery with the respective zinc electrodes 40 disposed alternately therebetween, and insulating the respective silver and zinc electrode compartments, without the necessity for separate individual separators being incorporated in the battery with means for supporting such separators so as to insulate the electrode compartments.

EXAMPLE 7

The procedure of Examples 1 and 2 is repeated, except in each case, in place of the magnesium silicate-iron silicate powder, a presintered aluminosilicate powder is employed, the latter inorganic material employed in amount of 70% by weight, the amount of short potassium titanate fibers employed being about 20% and the amount of polyphenylene oxide employed being about 10% by weight.

Results similar to those of Examples 1 and 2 above are obtained, except that flexible membranes or separators obtained in Examples 1 and 2 are somewhat less flexible than the separators of the present example due to the larger amount of organic polymer employed herein.

EXAMPLE 8

The procedure of Examples 1 and 2 above is followed substantially except for employing in place of polyphenylene oxide the same amount of polysulfone and dimethyl acetamide solvent.

Results similar to those of Examples 1 and 2 are obtained except that the resistivity of the separator film is somewhat higher, that is, about 10 to about 20 ohm-cm. as compared to the 5–10 ohm-cm. resistivity in Examples 1 and 2.

EXAMPLE 9

The procedure of Example 2 is repeated except that in place of a silver electrode, cadmium electrodes are dip-coated, as described in Example 2.

Such cadmium-separator unit is incorporated in a battery as illustrated in FIG. 5, together with a conventional nickel electrode to form a nickel-cadmium battery, and in another case, such cadmium-separator units are incorporated in a battery of the type illustrated in FIG. 5 employing a conventional silver electrode to form a silver-cadmium battery.

In the case of the nickel-cadmium battery, the battery operates for over 200 charge-discharge cycles, and the silver-cadmium battery for over 150 charge-discharge cycles, at both 25° C. and 100° C. employing ½ hour charge-½ hour discharge cycles.

It will be understood that in the embodiments of FIGS. 5 and 6, the conventional zinc electrodes can be in the form of an electrode-separator unit as illustrated in FIG. 2 according to the invention, and having a flexible porous separator film covering the electrode and produced, e.g., by dip-coating a conventional zinc electrode by procedure as described in Example 2 above. In such modifications, both the silver and zinc electrodes of FIGS. 5 and 6 are then covered and insulated by a flexible essentially inorganic separator according to the invention.

From the foregoing, it is seen that the invention provides a novel porous membrane composed chiefly of inorganic material, yet which is flexible, and which is particularly useful as a separator in batteries, especially high energy density batteries, and electrode-flexible separator units in which the flexible porous separator is in the form of a firmly adherent thin light weight film which is readily applied, e.g., by dip coating, to an electrode, and is effective for high rate battery applications.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A flexible porous battery separator comprising a cast and cured membrane which comprises a major portion of an inorganic separator material, a minor portion of a second different inorganic material consisting of potassium titanate in the form of short fibers, and a minor portion of a cured organic polymer bonding the particles of said inorganic separator material and said potassium titanate fibers together, and forming a highly flexible porous thin membrane structure, said separator having a porosity of about 10% to about 40%.

2. A flexible porous battery separator as defined in claim 1, said separator having a pore size ranging from about 1 to about 200 angstrom units and a thickness of about 0.001 to about 0.025 inch.

3. A flexible porous battery separator as defined in claim 1, said inorganic separator material being present in said mixture in an amount of about 60 to about 95%, said potassium titanate fibers being present in an amount of about 2 to about 35%, and said organic polymeric material being present in amount of about 2 to about 35%, by weight of said mixture, said potassium titanate fibers being less than about 0.008" in length.

4. A flexible porous battery separator as defined in claim 3, said organic polymer being polyphenylene oxide.

5. A flexible porous battery separator as defined in claim 2, including a support for said separator in the form of a metal battery electrode, said flexible porous separator being secured to the surface of said electrode.

6. A battery comprising a pair of electrodes of opposite polarity, and positioned between said electrodes for retaining electrolytes, a flexible porous separator as defined in claim 1.

7. A battery comprising a pair of electrodes of opposite polarity, and positioned between said electrodes for retaining electrolyte, a flexible porous separator as defined in claim 3.

8. A battery comprising a pair of electrodes of opposite polarity, and positioned between said electrodes for retaining electrolyte, a flexible porous separator as defined in claim 1, said separator being secured to the surface of at least one of said electrodes and forming an electrode-separator unit.

9. A battery comprising a pair of electrodes of opposite polarity, and positioned between said electrodes for retaining electrolyte, a flexible porous separator as defined in claim 4, said separator being secured to the surface of at least one of said electrodes and forming an electrode-separator unit.

10. A battery as defined in claim 8, including a plurality of said electrode-separator units, and a plurality of second electrode members arranged in side-by-side relation, with said electrode-separator units in alternating arrangement with said electrode members.

11. A flexible porous battery separator as defined in claim 1, wherein said inorganic separator material is selected from the group consisting of insoluble hydrous metal oxides, aluminosilicates, a solid solution of magnesium silicate and a member selected from the group consisting of zinc silicate and iron silicate, a solid solution of an aluminum-bearing material and a substance selected from the group consisting of chromium, cobalt, nickel, magnesium, calcium and iron-bearing materials, and magnesium silicate.

12. A flexible porous battery separator as defined in claim 1, said organic polymer being selected from the group consisting of polyphenylene oxide, polysulfone, polyamides, neoprene rubber, polyepoxides and fluorocarbon polymers.

13. A flexible porous battery separator as defined in claim 1, wherein said inorganic separator material is selected from the group consisting of insoluble hydrous metal oxides, aluminosilicates, a solid solution of magnesium silicate and a member selected from the group consisting of zinc silicate and iron silicate, a solid solution of an aluminum-bearing material and a substance selected from the group consisting of chromium, cobalt, nickel, magnesium, calcium and iron-bearing materials, and magnesium silicate, said organic polymer being selected from the group consisting of polyphenylene oxide, polysulfone, polyamides, neoprene rubber, polyepoxides and fluorocarbon polymers.

14. A flexible porous battery separator which comprises a major portion of a particulate solid solution of magnesium silicate and iron silicate, a minor portion of potassium titanate in the form of short fibers, and a minor portion of cured polyphenylene oxide bonding the particles of said solid solution of magnesium silicate and iron silicate, and said potassium titanate fibers together, and forming a porous structure, said separator having a porosity of about 10% to about 40%.

15. A flexible porous separator as defined in claim 14, including a support for said separator in the form of a metal battery electrode, said flexible porous separator being secured to the surface of said electrode.

16. A battery comprising a pair of electrodes of opposite polarity, and positioned between said electrodes for retaining electrolyte, a flexible porous separator as defined in claim 14.

(References on following page)

References Cited

UNITED STATES PATENTS

| | | | |
|---|---|---|---|
| 2,653,985 | 9/1953 | Philipps | 136—145 |
| 3,364,077 | 1/1968 | Arrance et al. | 136—146 |
| 3,379,569 | 4/1968 | Berger et al. | 136—146 XR |
| 3,421,970 | 1/1969 | Daly et al. | 260—37 XR |

WINSTON A. DOUGLAS, Primary Examiner

D. L. WALTON, Assistant Examiner

U.S. Cl. X.R.

136—146, 148